United States Patent
Toniolo et al.

(10) Patent No.: US 9,991,057 B2
(45) Date of Patent: Jun. 5, 2018

(54) HYBRID FLUOROPOLYMER COMPOSITION

(71) Applicant: SOLVAY SPECIALTY POLYMERS ITALY S.P.A., Bollate (IT)

(72) Inventors: Paolo Toniolo, Cesate (IT); Paula Cojocaru, Legnano (IT); Stefano Mortara, Arconate (IT); Julio A. Abusleme, Saronno (IT)

(73) Assignee: SOLVAY SPECIALTY POLYMERS ITALY S.P.A, Bollate (Milan) (IT)

( * ) Notice: Subject to any disclaimer, the term of this patent is extended or adjusted under 35 U.S.C. 154(b) by 145 days.

(21) Appl. No.: 14/420,087

(22) PCT Filed: Jul. 29, 2013

(86) PCT No.: PCT/EP2013/065874
§ 371 (c)(1),
(2) Date: Feb. 6, 2015

(87) PCT Pub. No.: WO2014/023593
PCT Pub. Date: Feb. 13, 2014

(65) Prior Publication Data
US 2015/0194271 A1    Jul. 9, 2015

(30) Foreign Application Priority Data
Aug. 6, 2012  (EP) .................... 12179376

(51) Int. Cl.
| | |
|---|---|
| *H01G 9/20* | (2006.01) |
| *C08J 5/18* | (2006.01) |
| *C08K 3/36* | (2006.01) |
| *H01M 10/0525* | (2010.01) |
| *H01M 10/0565* | (2010.01) |
| *C08F 214/18* | (2006.01) |
| *C08F 214/26* | (2006.01) |

(52) U.S. Cl.
CPC ......... *H01G 9/2009* (2013.01); *C08F 214/18* (2013.01); *C08F 214/26* (2013.01); *C08J 5/18* (2013.01); *C08K 3/36* (2013.01); *H01M 10/0525* (2013.01); *H01M 10/0565* (2013.01); *C08J 2327/16* (2013.01); *H01M 2300/0082* (2013.01)

(58) Field of Classification Search
CPC ......... H01M 10/0525; H01M 10/0565; H01M 2300/0082; C08J 5/18; H01G 9/2009
See application file for complete search history.

(56) References Cited

U.S. PATENT DOCUMENTS

| | | |
|---|---|---|
| 6,203,944 B1 | 3/2001 | Turner et al. |
| 2009/0163636 A1 | 6/2009 | Muenzmay et al. |
| 2011/0166025 A1 | 7/2011 | Jentzer et al. |
| 2013/0023620 A1* | 1/2013 | Abusleme ............... C08F 8/00 524/546 |
| 2013/0266723 A1* | 10/2013 | Cheng ................... C08K 5/11 427/58 |

FOREIGN PATENT DOCUMENTS

| | | |
|---|---|---|
| WO | 0003444 A1 | 1/2000 |
| WO | 2007101929 A1 | 9/2007 |
| WO | 2008129041 A1 | 10/2008 |
| WO | 2011121078 A1 | 10/2011 |
| WO | 2011154661 A1 | 12/2011 |
| WO | 2012079506 A1 | 6/2012 |

OTHER PUBLICATIONS

"Use of blends of the new diester Rhodiasolv IRIS and dimethyl sulphoxide (DMSO) in order to replace solvents with bad HSE profiles such as N-methylpyrrolidone (NMP), dimethyl formamide (DMF), dimethyl acetamide (DMAC) invarious applications", Internet Citation, Jan. 7, 2011 (Jan. 7, 2011), XP002683025, Retrieved from the Internet: URL:http://ip.com/IPCOM/000202891 [retrieved on Sep. 7, 2012].

* cited by examiner

*Primary Examiner* — Ula C Ruddock
*Assistant Examiner* — Matthew W Van Oudenaren

(57) ABSTRACT

The present invention pertains to a hybrid fluoropolymer composition, to a process for its manufacture and to its use in the manufacture of fluoropolymer films.

20 Claims, No Drawings

HYBRID FLUOROPOLYMER COMPOSITION

This application is a U.S. national stage entry under 35 U.S.C. § 371 of International Application No. PCT/EP2013/065874 filed Jul. 29, 2013, which claims priority to European application No. 12179376.4 filed on Aug. 6, 2012. The entire contents of these applications are explicitly incorporated herein by this reference.

TECHNICAL FIELD

The present invention pertains to a hybrid fluoropolymer composition, to a process for its manufacture and to its use in the manufacture of fluoropolymer films.

BACKGROUND ART

Dye-sensitized solar cells (DSSCs) are currently attracting great interest owing to their low production costs and high energy conversion efficiencies to be a potential alternative to conventional inorganic photovoltaic devices.

The DSSCs are typically based on a metal oxide semiconductor layer, in particular a $TiO_2$ semiconductor layer, coated with a dye layer, which is in contact with a redox electrolyte.

By using ruthenium complex sensitizers and liquid electrolytes, high energy conversion efficiencies have been reported for DSSCs. However, the presence of a liquid electrolyte in DSSCs triggers several problems including the leakage and evaporation of the liquid solvent, the possible desorption of the attached dyes and the corrosion of the counter electrodes, which limit the long-term performance and practical use of the DSSCs.

Several methods have been proposed to reduce the evaporation and leakage of the liquid electrolyte by using solid or gel materials in substitution for the liquid electrolyte. The main alternatives include gel materials incorporating redox couples. However, the ion diffusion and conductivity characteristics of the solid and gel electrolytes are usually less than that of a liquid electrolyte.

Fluoropolymers, in particular vinylidene fluoride polymers, have been used as raw materials for polymer gel electrolytes because of their superior properties in terms of ionic conductivity and thermal stability.

Nevertheless, polymer gel electrolytes might not incorporate and retain liquid plasticizer/liquid electrolyte in an effective manner during both manufacturing of the cell and operation of the same and/or might not possess suitable mechanical properties as required for effective separation of the electrodes.

On the other side, hybridization of organic and inorganic compounds is an important and evolutionary way to create polymeric compounds having, notably, enhanced mechanical properties. To elaborate such organic-inorganic polymer hybrids, sol-gel processes using metal alkoxides is the most useful and important approach. By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds.

Within this scenario, WO 2011/121078 (SOLVAY SOLEXIS S.P.A) 6 Oct. 2011 discloses certain fluoropolymer-based hybrid organic/inorganic composites obtained by a process involving the reaction of certain functional fluoropolymers possessing hydroxyl groups with certain hydrolysable compounds of Si, Ti, or Zr, and subsequent hydrolysis and polycondensation of the compounds so obtained. This patent document also mentions that the so obtained hybrid organic/inorganic composites can be notably used for various applications including manufacture of membranes for electrochemical applications. Thus, certain embodiments have been exemplified in such patent document, wherein films made by casting of the mentioned hybrid organic/inorganic composites were swelled with an electrolyte solution comprising a solvent (mixture of ethylene carbonate and propylene carbonate) and an electrolyte ($LiPF_6$).

In order to ensure appropriate workability during fluoropolymer-based hybrid composite manufacture and/or during casting of the same, it is current practice to use organic solvents such as N-methyl-2-pyrrolidone (NMP), possibly in admixture with other solvents.

Nevertheless, the use of NMP is attracting more and more concerns, having regards to the safety risks associated to its handling and to possible leakage/emissions in the environment. NMP has been notably classified according to the European regulation (EC) No1272/2008 in the hazard class Repr.1B code H360D (may damage the unburned child), Eye Irrit.2 code H319, STOT SE 3 code H335, Skin Irrit.2 H315 and according to the European directive 67/548/EEC it is classified as Reprotoxic Cat2 code R61, Xi codes R36/37/38. Further more, it is submitted to the Toxic Release Inventory (SARA Title III Section 313).

SUMMARY OF INVENTION

The invention thus provides a process for manufacturing a fluoropolymer hybrid organic/inorganic composite, said process comprising:

(i) providing a mixture comprising:
(a) at least one fluoropolymer comprising recurring units derived from at least one fluorinated monomer and at least one comonomer [comonomer (MA)] comprising at least one hydroxyl group [polymer (F)];
(b) at least one metal compound [compound (M)] of formula (I):

$$X_{4-m}AY_m \qquad (I)$$

wherein m is an integer from 1 to 4, and, according to certain embodiments, from 1 to 3, A is a metal selected from the group consisting of Si, Ti and Zr, Y is a hydrolysable group, X is a hydrocarbon group, optionally comprising one or more functional groups;
(c) a liquid medium comprising at least one compound selected from the group consisting of a diester of formula ($II_{de}$) and an ester-amide of formula ($II_{ea}$):

$$R^1\text{—OOC—}Z_{de}\text{—COO—}R^2 \qquad (II_{de})$$

$$R^1\text{—OOC—}Z_{ea}\text{—CO—NR}^3R^4 \qquad (II_{ea})$$

wherein:
$R^1$ and $R^2$, equal to or different from each other, are independently selected from the group consisting of $C_1$-$C_{20}$ hydrocarbon groups,
$R^3$ and $R^4$, equal to or different from each other, are independently selected from the group consisting of hydrogen, $C_1$-$C_{36}$ hydrocarbon groups, possibly substituted, being understood that $R^3$ and $R^4$ might be part of a cyclic moiety including the nitrogen atom to which they are bound, said cyclic moiety being possibly substituted and/or possibly comprising one or more than one additional heteroatom, and mixtures thereof, $Z_{de}$ and $Z_{ea}$, equal to or different from each other, are independently a linear or branched $C_3$-$C_{10}$ divalent alkylene group; and (d) optionally, at least one electrolytic salt (ES);

(ii) reacting at least a fraction of hydroxyl groups of said comonomer (MA) of said polymer (F) with at least a fraction of the hydrolysable groups Y of said compound (M), so as to obtain a grafted fluoropolymer [polymer (Fg)] comprising one or more pendant groups of formula —$Y_{m-1}AX_{4-m}$, wherein m, Y, A and X have the same meaning as defined above; and (iii) hydrolysing and/or polycondensing said compound (M) and/or said pendant groups of formula —$Y_{m-1}AX_{4-m}$ to yield a liquid mixture comprising the fluoropolymer hybrid organic/inorganic composite and incorporating said liquid medium.

Further, the invention pertains to a fluoropolymer hybrid organic/inorganic composite, said hybrid being obtainable by reaction between:

(a) at least one fluoropolymer [polymer (F)] as defined above, (b) at least one metal compound [compound (M)] of formula (I) as defined above, (c) a liquid medium comprising at least one compound selected from the group consisting of a diester of formula ($II_{de}$) and an ester-amide of formula ($II_{ea}$) as defined above, and (d) optionally, at least one electrolytic salt (ES), wherein one or more pendant groups of formula —$Y_{m-1}AX_{4-m}$, wherein m, Y, A and X have the same meaning as defined above, are grafted to the polymer (F) through reaction of at least a fraction of the hydroxyl groups of the comonomer (MA) of said polymer (F) with at least a fraction of the hydrolysable groups Y of said compound (M).

It has been surprisingly found that the fluoropolymer hybrid organic/inorganic composite of the present invention advantageously exhibits improved viscosity to be suitably used in the manufacture of fluoropolymer films such as polymer electrolyte separators endowed with enhanced ionic conductivity for use in electrochemical and photo-electrochemical devices, while obviating to environmental and safety concerns due to use of NMP or other similar solvents.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one comonomer (MA)" is understood to mean that the polymer (F) may comprise recurring units derived from one or more than one comonomers (MA) as defined above. In the rest of the text, the expression "comonomer (MA)" is understood, for the purposes of the present invention, both in the plural and the singular, that is to say that they denote both one or more than one comonomers (MA) as defined above.

The comonomer (MA) of the polymer (F) may be selected from the group consisting of fluorinated monomers comprising at least one hydroxyl group and hydrogenated monomers comprising at least one hydroxyl group.

By the term "fluorinated monomer", it is hereby intended to denote an ethylenically unsaturated monomer comprising at least one fluorine atom.

By the term "hydrogenated monomer", it is hereby intended to denote an ethylenically unsaturated monomer comprising at least one hydrogen atom and free from fluorine atoms.

The polymer (F) comprises preferably at least 0.05% by moles, more preferably at least 0.1% by moles, even more preferably at least 0.2% by moles of recurring units derived from said comonomer (MA) as defined above.

The polymer (F) comprises preferably at most 20% by moles, more preferably at most 18% by moles, even more preferably at most 10% by moles, most preferably at most 3% by moles of recurring units derived from said comonomer (MA) as defined above.

Determination of average mole percentage of comonomer (MA) recurring units in polymer (F) can be performed by any suitable method. Mention can be notably made of acid-base titration methods, well suited e.g. for the determination of the acrylic acid content, of NMR methods, adequate for the quantification of comonomers (MA) comprising aliphatic hydrogens in side chains, of weight balance based on total fed comonomer (MA) and unreacted residual comonomer (MA) during polymer (F) manufacture.

The comonomer (MA) is typically selected from the group consisting of hydrogenated monomers comprising at least one hydroxyl group.

The comonomer (MA) is preferably selected from the group consisting of (meth)acrylic monomers of formula (III) or vinylether monomers of formula (IV):

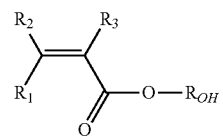

(III)

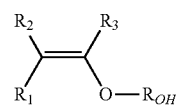

(IV)

wherein each of $R_1$, $R_2$ and $R_3$, equal to or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

The comonomer (MA) more preferably complies with formula (III) as defined above.

The comonomer (MA) even more preferably complies with formula (III-A):

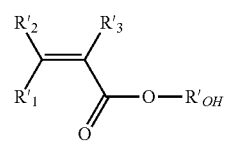

(III-A)

wherein $R'_1$, $R'_2$ and $R'_3$ are hydrogen atoms and $R'O_H$ is a $C_1$-$C_5$ hydrocarbon moiety comprising at least one hydroxyl group.

Non limitative examples of comonomers (MA) include, notably, hydroxyethyl(meth)acrylate, hydroxypropyl(meth)acrylate; hydroxyethylhexyl(meth)acrylates.

The comonomer (MA) is most preferably selected among the followings:

hydroxyethylacrylate (HEA) of formula:

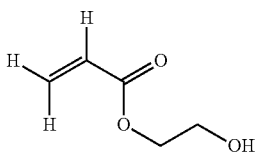

2-hydroxypropyl acrylate (HPA) of either of formulae:

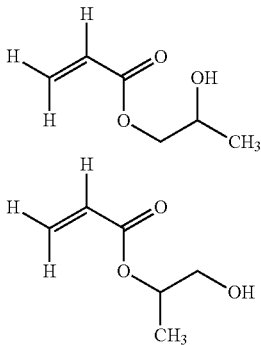

and mixtures thereof.

The polymer (F) may be amorphous or semi-crystalline.

The term "amorphous" is hereby to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Non limitative examples of suitable fluorinated monomers include, notably, the followings:

$C_3$-$C_8$ perfluoroolefins, such as tetrafluoroethylene, and hexafluoropropene;

$C_2$-$C_8$ hydrogenated fluoroolefins, such as vinylidene fluoride, vinyl fluoride, 1,2-difluoroethylene and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;

functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

Non limitative examples of suitable hydrogenated monomers include, notably, non-fluorinated monomers such as ethylene, propylene, vinyl monomers such as vinyl acetate, acrylic monomers, like methyl methacrylate, butyl acrylate, as well as styrene monomers, like styrene and p-methylstyrene.

The polymer (F) comprises preferably more than 25% by moles, preferably more than 30% by moles, more preferably more than 40% by moles of recurring units derived from at least one fluorinated monomer.

The polymer (F) comprises preferably more than 1% by moles, preferably more than 5% by moles, more preferably more than 10% by moles of recurring units derived from at least one hydrogenated monomer different from comonomer (MA).

The fluorinated monomer can further comprise one or more other halogen atoms (Cl, Br, I). Should the fluorinated monomer be free of hydrogen atoms, it is designated as per(halo)fluoromonomer. Should the fluorinated monomer comprise at least one hydrogen atom, it is designated as hydrogen-containing fluorinated monomer.

Should the fluorinated monomer be a hydrogen-containing fluorinated monomer, such as for instance vinylidene fluoride, trifluoroethylene, vinylfluoride, the hydrogen-containing fluoropolymer of the invention can be either a polymer comprising, in addition to recurring units derived from at least one comonomer (MA) as defined above, recurring units derived only from said hydrogen-containing fluorinated monomer, or it can be a copolymer comprising recurring units derived from at least one comonomer (MA) as defined above, said hydrogen-containing fluorinated monomer and from at least one other monomer.

Should the fluorinated monomer be a per(halo)fluoromonomer, such as for instance tetrafluoroethylene, chlorotrifluoroethylene, hexafluoropropylene, perfluoroalkylvinylethers, the hydrogen-containing fluoropolymer of the invention is a polymer comprising recurring units derived from at least one comonomer (MA) as defined above, recurring units derived from said per(halo)fluoromonomer and from at least one other hydrogenated monomer different from said comonomer (MA), such as for instance ethylene, propylene, vinylethers, acrylic monomers.

Preferred polymers (F) are those wherein the fluorinated monomer is chosen from the group consisting of vinylidene fluoride (VDF), tetrafluoroethylene (TFE) and chlorotrifluoroethylene (CTFE).

The polymer (F) is more preferably selected from the group consisting of:

polymers (F-1) comprising recurring units derived from at least one comonomer (MA) as defined above, from at least one per(halo)fluoromonomer selected from TFE and CTFE, and from at least one hydrogenated monomer selected from ethylene, propylene and isobutylene, optionally containing one or more additional comonomers, typically in amounts of from 0.1% to 30% by moles, based on the total amount of TFE and/or CTFE and said hydrogenated monomer(s); and polymers (F-2) comprising recurring units derived from at least one comonomer (MA) as defined above, from VDF, and, optionally, from one or more fluorinated monomers different from VDF.

In polymers (F-1) as defined above, the molar ratio per(halo)fluoromonomer(s)/hydrogenated comonomer(s) is typically of from 30:70 to 70:30. In polymers (F-1) as defined above, the hydrogenated monomer preferably comprises ethylene, optionally in combination with other hydrogenated monomers.

Polymers (F-1) wherein the per(halo)fluoromonomer is predominantly CTFE only will be identified herein below as ECTFE copolymers; polymers (F-1) wherein the per(halo)fluoromonomer is predominantly TFE only will be identified herein below as ETFE copolymers.

The ECTFE and ETFE (F-1) copolymers preferably comprise:
(a) from 35% to 65% by moles, preferably from 45% to 55% by moles, more preferably from 48% to 52% by moles of ethylene (E);
(b) from 65% to 35% by moles, preferably from 55% to 45% by moles, more preferably from 52% to 48% by moles of at least one of chlorotrifluoroethylene (CTFE) and tetrafluoroethylene (TFE) or mixture thereof;
(c) from 0.05% to 20% by moles, preferably from 0.1% to 18% by moles, more preferably from 0.2% to 10% by moles of at least one (meth)acrylic monomer of formula (III) as defined above.

Among polymers (F-1), ECTFE polymers are preferred.

The polymers (F-2) preferably comprise:
(a') at least 60% by moles, preferably at least 75% by moles, more preferably at least 85% by moles of vinylidene fluoride (VDF);
(b') optionally, from 0.1% to 15% by moles, preferably from 0.1% to 12% by moles, more preferably from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.05% to 20% by moles, preferably from 0.1% to 18% by moles, more preferably from 0.2% to 10% by moles of at least one (meth)acrylic monomer of formula (III) as defined above.

The metal compound [compound (M)] of formula $X_{4-m}AY_m$ (I) can comprise one or more functional groups on any of groups X and Y, preferably on at least one group X.

In case compound (M) comprises at least one functional group, it will be designated as functional compound (M); in case none of groups X and Y comprises a functional group, compound (M) will be designated as non-functional compound (M).

Mixtures of one or more functional compound (M) and one or more non-functional compound (M) can be used in the process of the invention and in the manufacture of the hybrid composite of the invention. Otherwise functional compound(s) (M) or non-functional compound(s) (M) can be separately used.

Functional compounds (M) can advantageously provide for hybrid composites having functional groups, so that further modifying the chemistry and the properties of the hybrid composite over native polymer (F) and native inorganic phase.

To this aim it is generally preferred that any of groups X of compound (M) of formula $X_{4-m}AY_m$ comprises one or more functional group.

The selection of the hydrolysable group Y of the compound (M) is not particularly limited, provided that it enables in appropriate conditions formation of a —O-A≡ bond; said hydrolysable group can be notably a halogen (especially a chlorine atom), a hydrocarboxy group, a acyloxy group, a hydroxyl group.

The compound (M) preferably complies with formula (I-A):

$$R'_{4-m'}E(OR'')_{m'} \quad \text{(I-A)}$$

wherein m' is an integer from 1 to 4, and, according to certain embodiments, from 1 to 3, E is a metal selected from the group consisting of Si, Ti and Zr, R' and R'', equal to or different from each other and at each occurrence, are independently selected from $C_1$-$C_{18}$ hydrocarbon groups, optionally comprising one or more functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

With the aim of manufacturing fluoropolymer hybrid organic/inorganic composites which can exhibit functional behaviour in terms of hydrophilicity or ionic conductivity, functional group of compound (M) will be preferably selected among carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; most preferred will be carboxylic acid group (in its acid, ester, amide, anhydride, salt or halide form) and sulphonic group (in its acid, ester, salt or halide form).

The compound (M) more preferably complies with formula (I-B):

$$R^A_{4-m^*}E^*(OR^B)_{m^*} \quad \text{(I-B)}$$

wherein m* is an integer from 2 to 3, E* is a metal selected from the group consisting of Si, Ti and Zr, $R^A$, equal to or different from each other and at each occurrence, is a $C_1$-$C_{12}$ hydrocarbon group, optionally comprising one or more functional groups; $R^B$, equal to or different from each other and at each occurrence, is a $C_1$-$C_5$ linear or branched alkyl radical, preferably $R^B$ is methyl or ethyl.

Examples of functional compounds (M) are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

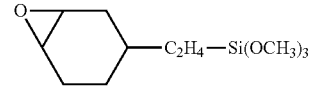

glycidoxypropylmethyldiethoxysilane of formula:

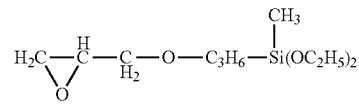

glycidoxypropyltrimethoxysilane of formula:

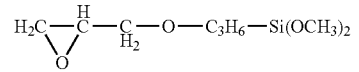

methacryloxypropyltrimethoxysilane of formula:

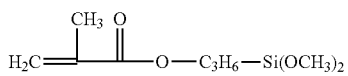

aminoethylaminpropylmethyldimethoxysilane of formula:

aminoethylaminpropyltrimethoxysilane of formula:
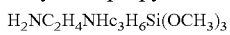
3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

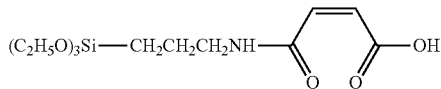

3-(trihydroxysilyl)-1-propane-sulphonic acid of formula $HOSO_2—CH_2CH_2CH_2—Si(OH)_3$, N-(trimethoxysilylpropyl)ethylene-diamine triacetic acid, and its sodium salts, 3-(triethoxysilyl)propylsuccinic anhydride of formula:

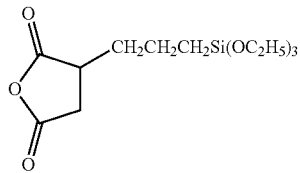

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional compounds (M) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

By the term "liquid medium", it is hereby intended to denote a medium which exists in the liquid state at 20° C. under atmospheric pressure.

The liquid medium may comprise a mixture of more than one diesters of formula ($II_{de}$), a mixture of more than one ester-amides of formula ($II_{ea}$) or may comprise a mixture of one or more than one diesters of formula ($II_{de}$) and one or more than one ester-amides of formula ($II_{ea}$).

In formulae ($II_{de}$) and ($II_{ea}$), $R^1$ and $R^2$, equal to or different from each other, are preferably selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, and mixtures thereof.

The expression "$C_1$-$C_{20}$ alkyl" is used according to its usual meaning and it encompasses notably linear, cyclic, branched saturated hydrocarbon chain having from 1 to 20 carbon atoms and preferably from 1 or 2 to 10 carbon atoms.

The expression "$C_1$-$C_{20}$ aryl" is used according to its usual meaning and it encompasses notably aromatic mono- or poly-cyclic groups, preferably mono- or bi-cyclic groups, comprising from 6 to 12 carbon atoms, preferably phenyl or naphthyl.

The expression "$C_1$-$C_{20}$ arylalkyl" is used according to its usual meaning and it encompasses linear, branched or cyclic saturated hydrocarbon groups comprising, as substituent, one or more than one aromatic mono- or poly-cyclic groups, such as, notably benzyl group.

The expression "$C_1$-$C_{20}$ alkylaryl" is used according to its usual meaning and it encompasses aromatic mono- or poly-cyclic groups comprising, as substituent, one or more than one alkyl groups, e.g. one or more than one linear, cyclic, branched saturated hydrocarbon chain having from 1 to 14 carbon atoms and preferably from 1 or 2 to 10 carbon atoms.

In formulae ($II_{de}$) and ($II_{ea}$), $R^1$ and $R^2$, equal to or different from each other, are preferably selected from the group consisting of methyl, ethyl, n-propyl, isopropyl, n-butyl, isobutyl, terbutyl, sec-butyl, 2-ethyl-butyl, n-pentyl, isopentyl, sec-pentyl, cyclopentyl, n-hexyl, isohexyl, sec-hexyl, 2-ethylhexyl, sec-heptyl, 3-methyl-hexyl, 4-methyl-hexyl, 1-ethyl-pentyl, 2-ethyl-pentyl, 3-ethyl-pentyl, n-octyl, isooctyl, 3-methyl-heptyl, n-nonyl, n-decyl, n-undecyl, n-dodecyl, n-tridecyl, n-tetradecyl, n-pentadecyl, cyclohexyl, phenyl and benzyl.

In formula ($II_{ea}$), $R^3$ and $R^4$, equal to or different from each other, are preferably selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituents, possibly having one or more than one heteroatoms, and of cyclic moieties comprising both $R^3$ and $R^4$ and the nitrogen atom to which they are bound, said cyclic moieties possibly comprising one or more than one heteroatoms, e.g. an oxygen atom or an additional nitrogen atom.

In formula ($II_{ea}$), $R^3$ and $R^4$, equal to or different from each other, are more preferably selected from the group consisting of methyl, ethyl, hydroxyethyl, n-propyl, isopropyl, n-butyl, isobutyl, terbutyl, n-pentyl, isopentyl, hexyl, cyclohexyl, most preferably from the group consisting of methyl, ethyl and hydroxyethyl.

According to a first embodiment of the invention, $Z_{de}$ in formula ($II_{de}$) and $Z_{ea}$ in formula ($II_{ea}$) are branched $C_3$-$C_{10}$ divalent alkylene groups.

According to this first embodiment, $Z_{de}$ in formula ($II_{de}$) and $Z_{ea}$ in formula ($II_{ea}$) are preferably selected from the group consisting of:
$Z_{MG}$ groups of formula $MG_a$ —$CH(CH_3)$—$CH_2$—$CH_2$— or $MG_b$ —$CH_2CH_2$—$CH(CH_3)$—,
$Z_{ES}$ groups of formula $ES_a$ —$CH(C_2H_5)$—$CH_2$—, or $ES_b$ —$CH_2$—$CH(C_2H_5)$—, and
mixtures thereof.

In one more preferred variant of this first embodiment, the liquid medium comprises:
(i) at least one diester ($II'_{de}$) and at least one diester ($II''_{de}$), possibly in combination with at least one diester of formula ($II'''_{de}$); or
(ii) at least one ester-amide ($II'_{ea}$) and at least one ester-amide ($II''_{ea}$), possibly in combination with at least one ester-amide of formula ($II_{ea}$); or
(iii) combinations of (i) and (ii), wherein:
   ($II'_{de}$) is $R^1$—OOC—$Z_{MG}$—COO—$R^2$
   ($II'_{ea}$) is $R^1$—OOC—$Z_{MG}$—CO—$NR^3R^4$
   ($II''_{de}$) is $R^1$—OOC—$Z_{ES}$—COO—$R^2$
   ($II''_{ea}$) is $R^1$—OOC—$Z_{ES}$—CO—$NR^3R^4$; and
   ($II'''_{de}$) is $R^1$—OOC—$(CH_2)_4$—COO—$R^2$,
wherein:
   $Z_{MG}$ is of formula $MG_a$ —CH($CH_3$)—$CH_2$—$CH_2$— or $MG_b$ —$CH_2$—$CH_2$—CH($CH_3$)—,
   $Z_{ES}$ is of formula $ES_a$—CH($C_2H_5$)—$CH_2$—, or $ES_b$—$CH_2$—CH($C_2H_5$)—; and wherein $R^1$ and $R^2$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups;
   $R^3$ and $R^4$, equal to or different from each other, are selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituent, possibly having one or more than one heteroatoms, and of cyclic moieties comprising both $R^3$ and $R^4$ and the nitrogen atom to which they are bound, said cyclic moieties possibly comprising one or more than one heteroatoms, e.g. an oxygen atom or an additional nitrogen atom.

In above mentioned formulae ($II'_{de}$), ($II''_{de}$) and ($II'''_{de}$), ($II'_{ea}$), ($II''_{ea}$) and ($II_{ea}$), $R^1$ and $R^2$ are preferably methyl groups, while $R^3$ and $R^4$, equal to or different from each other, are preferably selected from the group consisting of methyl, ethyl, hydroxyethyl.

According to this variant, the liquid medium may comprise:
(j) a diester mixture consisting essentially of:
   from 70% to 95% by weight of diester of formula ($II'_{de}$);
   from 5% to 30% by weight of diester of formula ($II''_{de}$), and
   from 0 to 10% by weight of diester of formula ($II'''_{de}$), as defined above;
or
(jj) an ester-amide mixture consisting essentially of:
   from 70% to 95% by weight of ester-amide of formula ($II'_{ea}$);
   from 5% to 30% by weight of ester-amide of formula ($II''_{ea}$), and
   from 0 to 10% by weight of ester-amide of formula ($II_{ea}$), as defined above; or
(jjj) mixtures of (j) and (jj), as defined above.

An example of the useful diester-based mixture wherein $Z_{de}$ in formula ($II_{de}$) and/or $Z_{ea}$ in formula ($II_{ea}$) is branched is RHODIASOLV® IRIS solvent, commercialized by Rhodia.

RHODIASOLV® IRIS solvent is a mixture of diesters comprising essentially (more than 80% by weight) of dimethyl ethylsuccinate and dimethyl 2-methylglutarate.

According to a second embodiment of the invention, $Z_{de}$ in formula ($II_{de}$) and $Z_{ea}$ in formula ($II_{ea}$) are $C_3$-$C_{10}$ linear divalent alkylene groups.

In a variant of this second embodiment, the liquid medium comprises:

(k) at least one diester ($III^4_{de}$), at least one diester ($III^3_{de}$) and at least one diester of formula ($III^2_{de}$); or
(kk) at least one ester-amide ($III^4_{ea}$), at least one ester-amide ($III^3_{ea}$) and at least one ester-amide of formula ($III^2_{ea}$); or
(kkk) combinations of (k) and (kk), wherein:
   ($III^4_{de}$) is $R^1$—OOC—$(CH_2)_4$—COO—$R^2$
   ($III^3_{de}$) is $R^1$—OOC—$(CH_2)_3$—COO—$R^2$
   ($III^2_{de}$) is $R^1$—OOC—$(CH_2)_2$—COO—$R^2$
   ($III^4_{ea}$) is $R^1$—OOC—$(CH_2)_4$—CO—$NR^3R^4$
   ($III^3_{ea}$) is $R^1$—OOC—$(CH_2)_3$—CO—$NR^3R^4$
   ($III^2_{ea}$) is $R^1$—OOC—$(CH_2)_2$—CO—$NR^3R^4$
wherein $R^1$ and $R^2$, equal to or different from each other, are independently $C_1$-$C_{20}$ alkyl, $C_1$-$C_{20}$ aryl, $C_1$-$C_{20}$ alkyaryl, $C_1$-$C_{20}$ arylalkyl groups;
   $R^3$ and $R^4$, equal to or different from each other, are selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituents, possibly having one or more than one heteroatoms, and of cyclic moieties comprising both $R^3$ and $R^4$ and the nitrogen atom to which they are bound, said cyclic moieties possibly comprising one or more than one heteroatoms, e.g. an oxygen atom or an additional nitrogen atom.

In above mentioned formulae ($III^4_{de}$), ($III^3_{de}$), ($III^2_{de}$), ($III^4_{ea}$), ($III^3_{ea}$) and ($III^2_{ea}$), $R^1$ and $R^2$ are preferably methyl groups, while $R^3$ and $R^4$, equal to or different from each other, are preferably selected from the group consisting of methyl, ethyl, hydroxyethyl.

According to certain preferred variants of this second embodiment, the liquid medium may comprise:
(I) a diester mixture consisting essentially of dimethyladipate, dimethylglutarate and dimethylsuccinate; or
(II) an ester-amide mixture consisting essentially of $H_3COOC$—$(CH_2)_4$—CO—$N(CH_3)_2$, $H_3COOC$—$(CH_2)_3$—CO—$N(CH_3)_2$, and $H_3COOC$—$(CH_2)_2$—CO—$N(CH_3)_2$; or
(III) a diester mixture of diethyladipate, diethylglutarate and diethylsuccinate; or
(Iv) an ester-amide mixture consisting essentially of $H_5C_2OOC$—$(CH_2)_4$—CO—$N(CH_3)_2$, $H_5C_2OOC$—$(CH_2)_3$—CO—$N(CH_3)_2$, and $H_5C_2OOC$—$(CH_2)_2$—CO—$N(CH_3)_2$; or
(v) a mixture of diisobutyladipate, diisobutylglutarate and diisobutylsuccinate; or
(vI) an ester-amide mixture consisting essentially of $H_9C_4OOC$—$(CH_2)_4$—CO—$N(CH_3)_2$, $H_9C_4OOC$—$(CH_2)_3$—CO—$N(CH_3)_2$, and $H_9C_4OOC$—$(CH_2)_2$—CO—$N(CH_3)_2$; or
(vII) mixtures thereof.

An exemplary embodiment of the variant listed above under section (I) is a diester mixture consisting essentially of:
   from 9% to 17% by weight of dimethyladipate;
   from 59% to 67% by weight of dimethylglutarate; and
   from 20% to 28% by weight of dimethylsuccinate.

An example of a useful diester-based mixture wherein $Z_{de}$ in formula ($II_{de}$) and/or $Z_{ea}$ in formula ($II_{ea}$) is linear is RHODIASOLV® RPDE solvent, marketed by Rhodia.

RHODIASOLV® RPDE solvent is a mixture of diesters comprising essentially (more than 70% by weight) of dimethylglutarate and dimethylsuccinate.

Diesters of formula ($II_{de}$) which can be used in the composition of the invention can be prepared notably according to the teachings of EP 1991519 A (RHODIA OPERATIONS) 19 Nov. 2008. Ester-amides of formula ($II_{ea}$) which can be used in the composition of the invention can be prepared notably according to the teachings of WO 2011/154661 (RHODIA OPERATIONS) 15 Dec. 2011 and US 2011/0166025 (RHODIA OPERATIONS) 7 Jul. 2011.

The liquid medium may further comprise dimethylsulfoxide (DMSO) and, optionally, one or more organic solvents (S) different from DMSO.

Should the liquid medium comprise DMSO, the weight ratio between one or more diesters of formula ($II_{de}$) and/or one or more ester-amides of formula ($II_{ea}$) and DMSO is typically of from 1:99 to 99:1, preferably of from 20:80 to 80:20, more preferably of from 70:30 to 30:70.

Should the liquid medium further comprise one or more organic solvents (S) different from DMSO, the amount of the organic solvent(s) (S) in said liquid medium is typically lower than 50% by weight, preferably lower than 25% by weight, based on the total weight of the liquid medium.

Non limitative examples of suitable organic solvents (S) include, notably, the followings:
- aliphatic hydrocarbons including, more particularly, the paraffins such as, in particular, pentane, hexane, heptane, octane, nonane, decane, undecane, dodecane or cyclohexane, and naphthalene and aromatic hydrocarbons and more particularly aromatic hydrocarbons such as, in particular, benzene, toluene, xylenes, cumene, petroleum fractions composed of a mixture of alkylbenzenes,
- aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane; monochlorobenzene, 1,2-dichlorobenzene, 1,3-dichlorobenzene, 1,4-dichlorobenzene, 1,2,4-trichlorobenzene or mixture of different chlorobenzenes,
- aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF),
- glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether,
- glycol ether esters such as ethylene glycol methyl ether acetate, ethylene glycol monoethyl ether acetate, ethylene glycol monobutyl ether acetate,
- alcohols such as methyl alcohol, ethyl alcohol, diacetone alcohol,
- ketones such as acetone, methylethylketone, methylisobutyl ketone, diisobutylketone, cyclohexanone, isophorone,
- linear or cyclic esters such as: isopropyl acetate, n-butyl acetate, methyl acetoacetate, dimethyl phthalate, g-butyrolactone,
- linear or cyclic carboxamides such as N,N-dimethylacetamide (DMAC), N,N-diethylacetamide, dimethylformamide (DMF), diethylformamide or N-methyl-2-pyrrolidone (NMP),
- organic carbonates for example dimethyl carbonate, diethyl carbonate, dipropyl carbonate, dibutyl carbonate, ethylmethyl carbonate, ethylene carbonate, vinylene carbonate,
- phosphoric esters such as trimethyl phosphate, triethyl phosphate,
- ureas such as tetramethylurea, tetraethylurea.

For embodiments wherein the mixture comprises one or more further organic solvents (S), the liquid medium is preferably free from solvents qualified as Carcinogenic, Mutagenic or Toxic to Reproduction according to chemical safety classification (CMR solvents); more specifically, the liquid medium is advantageously substantially free from NMP, DMF and DMAC.

Nevertheless, a liquid medium substantially free from any further organic solvent (S), i.e. consisting essentially of at least one compound selected from the group consisting of a diester of formula ($II_{de}$) and an ester-amide of formula ($II_{ea}$), optionally in combination with DMSO, is preferred.

By the term "electrolytic salt (ES)", it is hereby intended to denote a metal salt comprising electrically conductive ions.

A variety of metal salts may be employed as electrolytic salts (ES). Metal salts which are stable and soluble in the chosen liquid medium are generally used.

Non-(imitative examples of suitable electrolytic salts (ES) include, notably, MeI, $Me(PF_6)_n$, $Me(BF_4)_n$, $Me(ClO_4)_n$, Me(bis(oxalato)borate)$_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2, and redox electrolytes.

Preferred electrolytic salts (ES) are selected from the followings: LiI, $LiPF_6$, $LiBF_4$, $LiClO_4$, lithium bis(oxalato) borate ("LiBOB"), $LiCF_3SO_3$, $LiN(CF_3SO_2)_2$, $LiN(C_2F_5SO_2)_2$, $Me[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof, and redox electrolytes such as iodide/triiodide, disulfide/thiolate and tris(2,2'-bipyridine)cobalt(II/III) redox couples.

The process of the invention comprises reacting at least a fraction of hydroxyl groups of said comonomer (MA) of said polymer (F) with at least a fraction of the hydrolysable groups Y of said compound (M), so as to obtain a grafted fluoropolymer [polymer (Fg)] comprising pendant groups of formula —$Y_{m-1}AX_{4-m}$, wherein m, Y, A and X have the same meaning as defined above.

It is understood that the hydroxyl groups of the comonomer (MA) are able to react with the hydrolysable groups Y of the compound (M) so as to yield a covalent bond between the compound (M) moiety and the comonomer (MA) moiety.

For reacting the hydroxyl groups of the polymer (F) with the hydrolysable groups Y of the compound (M) as defined above, several techniques can be successfully used.

The polymer (F) and the compound (M) are typically reacted in liquid phase. According to this embodiment, the polymer (F) and the compound (M) are usually mixed either at room temperature (about 25° C.) or upon heating.

According to an embodiment of the invention, the mixture can further comprise, in addition to said polymer (F), said compound (M) and said liquid medium, at least one inorganic filler.

The inorganic filler is generally provided in the mixture under the form of particles.

The inorganic filler particles generally have an average particle size of from 2 nm to 100 nm, preferably of from 5 nm to 20 nm.

The choice of the inorganic filler is not particularly limited; nevertheless, inorganic fillers having on their surface reactive groups towards compound (M) are generally preferred.

Among surface reactive groups, mention is notably made of hydroxyl groups.

Without being bound by this theory, the Applicant believes that reaction between at least a fraction of compound (M) with at least a fraction of said surface reactive group of the inorganic filler can occur simultaneously with the reaction of at least a fraction of compound (M) with at least a fraction of the hydroxyl groups of the comonomer (MA), so that in subsequent hydrolysis and/or polycondensation step, chemical bonding between the polymer (F) and the inorganic filler is likely achieved through the inorganic domains derived from compound (M).

Among inorganic fillers suitable for being used in the process of the invention, mention can be made of inorganic oxides, including mixed oxides, metal sulphates, metal carbonates, metal sulfides and the like.

Among metal oxides, mention can be made of $SiO_2$, $TiO_2$, ZnO, $Al_2O_3$.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates are generally known as possessing a layered structure.

These silicates, aluminium-silicates and magnesium silicates, all optionally containing additional metals such as sodium, potassium, iron or lithium can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium can be selected among synthetic clays, like notably fluorohectorite, hectorite, laponite.

Best results have been obtained with particles of layered silicates, aluminium-silicates and magnesium silicates as defined above having at least one dimension of less than 100 nm, preferably of less than 50 nm, more preferably of less than 10 nm.

According to this embodiment, the fluoropolymer hybrid organic/inorganic composites of the invention comprise said inorganic fillers. Said inorganic fillers are typically comprised in the inorganic domains of the composite of the invention.

The process further comprises hydrolysing and/or polycondensing compound (M) and/or one or more pendant groups of formula —$Y_{m-1}AX_{4-m}$ as defined above to yield a fluoropolymer hybrid organic/inorganic composite comprising inorganic domains.

The hydrolysis and/or polycondensation can be carried out simultaneously to the step of reacting hydroxyl groups of polymer (F) and compound (M) or can be carried out once said reaction has occurred.

Typically, in particular for compounds wherein A is Si, this hydrolysis and/or polycondensation is initiated by addition of appropriate catalyst and/or reactant. Generally, water or a mixture of water and an acid can be used for promoting this reaction.

The choice of the acid is not particularly limited; both organic and inorganic acids can be used. HCl and formic acid (HCOOH) represent the preferred acids which can be used in the process of the invention.

In case of reaction between polymer (F) and compound (M) in liquid phase, addition of an aqueous medium preferably comprising an acid will be the preferred method for promoting the hydrolysis and/or polycondensation.

While this hydrolysis and/or polycondensation can take place at room temperature, it is generally preferred to carry out this step upon heating at a temperature exceeding 50° C.

In case of reaction in liquid phase, temperatures will be selected having regards to the boiling point of the liquid medium as defined above. Generally, temperatures between 50° C. and 150° C., preferably between 60° C. and 120° C. will be preferred.

It is understood that in this step hydrolysable group(s) Y of the compound (M) and/or pendant groups of formula —$Y_{m-1}AX_{4-m}$ as defined above will react so as to yield a hybrid composite comprising polymer domains consisting of chains of polymer (F) and inorganic domains consisting of residues derived from compound (M).

As this will be recognized by the skilled in the art, the hydrolysis and/or polycondensation reaction generally generate low molecular weight side products, which can be notably water or alcohol, as a function of the nature of the compound (M).

The fluoropolymer hybrid organic/inorganic composite comprising inorganic domains can be recovered from standard methods, which will depend upon techniques used in various reaction steps.

Also, other aspects of the invention pertain to the use of the fluoropolymer hybrid organic/inorganic composites of the present invention in different fields of use.

In particular, the invention pertains to use of the fluoropolymer hybrid organic/inorganic composite of the present invention for manufacturing a fluoropolymer film.

The invention thus pertains to a process for manufacturing a fluoropolymer film, said fluoropolymer film comprising the fluoropolymer hybrid organic/inorganic composite of the present invention and the liquid medium as defined above, said process comprising processing said film from the liquid mixture obtained in step (iii) of the process of the invention.

Techniques for processing a film from a liquid mixture are known in the art; the liquid mixture of step (iii) of the process of the invention is typically processed by casting.

Should the liquid mixture be processed by casting, it is typically applied by spreading on a support surface using standard devices, according to well-known techniques like doctor blade coating, metering rod (or Meyer rod) coating, slot die coating, knife over roll coating or "gap coating", and the like.

The choice of the support surface is not particularly limited, being understood that the fluoropolymer film can be manufactured directly as an unitary assembly or can be manufactured by casting onto another support surface, from which said fluoropolymer film can be detached and individualized.

The liquid mixture of step (iii) of the process of the invention is typically processed at room temperature (about 25° C.) or at a temperature exceeding 25° C., this latter condition being generally preferred.

The temperature can be selected so as to effect removal by evaporation of one or more organic solvents (S), if any.

It is nevertheless understood that the amount of one or more organic solvents (S), if any, which is stably incorporated and retained in the fluoropolymer film will be of at most 25% by weight, preferably of at most 20% by weight based on the total weight of said fluoropolymer film.

It is also understood that, depending on the processing conditions, the above mentioned low molecular weight side products generated by the hydrolysis and/or polycondensation reaction (which can be notably water or alcohol, as a function of the nature of the compound (M)) can be at least partially removed from the fluoropolymer film, possibly further promoting, by combined action of heat and side products removal, additional hydrolysis and/or polycondensation.

The invention thus further pertains to a fluoropolymer film, said fluoropolymer film comprising the fluoropolymer hybrid organic/inorganic composite of the present invention and the liquid medium as defined above, said liquid medium comprising at least one compound selected from the group consisting of a diester of formula ($II_{de}$) and an ester-amide of formula ($II_{ea}$) as defined above.

The fluoropolymer film of the present invention advantageously comprises from 1% to 30% by weight, preferably from 5% to 20% by weight of at least one polymer (F) as defined above.

It has been surprisingly found that, through the process of the present invention, a fluoropolymer film stably comprising and retaining a liquid medium comprising at least one compound selected from the group consisting of a diester of formula ($II_{de}$) and an ester-amide of formula ($II_{ea}$) as defined above can be successfully obtained, such fluoropolymer film being suitable for use as polymer electrolyte separator in electrochemical and photo-electrochemical devices.

According to an embodiment of the present invention, the fluoropolymer film is a polymer electrolyte separator comprising at least one electrolytic salt (ES) as defined above.

It has been surprisingly found that, due to the improved viscosity of the fluoropolymer hybrid organic/inorganic composite of the present invention, a polymer electrolyte separator can be obtained which successfully retains high fractions of liquid medium/electrolyte to be endowed with outstanding ionic conductivity.

The invention further pertains to use of the polymer electrolyte separator comprising at least one electrolytic salt (ES) as defined above in electrochemical and photo-electrochemical devices.

Non-limitative examples of suitable electrochemical devices include, notably, metal-ion secondary batteries.

The invention also pertains to a metal-ion secondary battery comprising the polymer electrolyte separator as defined above.

The metal-ion secondary battery is generally formed by assembling a negative electrode (cathode), the polymer electrolyte separator as defined above and a positive electrode (anode).

The metal-ion secondary battery is preferably an alkaline or alkaline-earth secondary battery.

Representative cathode (negative electrodes) materials of alkaline or alkaline-earth secondary batteries include:
- graphitic carbons able to intercalate alkaline or alkaline-earth metal, typically existing in forms such as powders, flakes, fibers or spheres (for example, mesocarbon microbeads) hosting at least one alkaline or alkaline-earth metal;
- alkaline or alkaline-earth metal;
- alkaline or alkaline-earth metal alloy compositions, including silicon-based alloys, germanium-based alloys;
- alkaline or alkaline-earth metal titanates, advantageously suitable for intercalating alkaline or alkaline-earth metal with no induced strain.

The metal-ion secondary battery is more preferably a Lithium-ion secondary battery, wherein the negative electrode material is selected from the group consisting of:
- graphitic carbons able to intercalate lithium, typically existing in forms such as powders, flakes, fibers or spheres (for example, mesocarbon microbeads) hosting lithium;
- lithium metal;
- lithium alloy compositions, including notably those described in U.S. Pat. No. 6,203,944 (3M INNOVATIVE PROPERTIES CO.) 20 Mar. 2001 and/or in WO 00/03444 (MINNESOTA MINING AND MANUFACTURING CO.) 20 Jan. 2000;
- lithium titanates, generally represented by formula $Li_4Ti_5O_{12}$; these compounds are generally considered as "zero-strain" insertion materials, having low level of physical expansion upon taking up the mobile ions, i.e. $Li^+$;
- lithium-silicon alloys, generally known as lithium silicides with high Li/Si ratios, in particular lithium silicides of formula $Li_{4.4}Si$;
- lithium-germanium alloys, including crystalline phases of formula $Li_{4.4}Ge$.

The negative electrode may contain additives as will be familiar to those skilled in the art. Among them, mention can be made notably of carbon black, graphene or carbon nanotubes. As will be appreciated by those skilled in the art, the negative electrode or cathode may be in any convenient form including foils, plates, rods, pastes or as a composite made by forming a coating of the negative electrode material on a conductive current collector or other suitable support.

Representative anode (positive electrodes) materials of alkaline or alkaline-earth secondary batteries include composites comprising a polymer binder (PB), a powdery electrode material and, optionally, an electroconductivity-imparting additive and/or a viscosity modifying agent.

In the case of forming a positive electrode for a Lithium-ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$. An electroconductivity-imparting additive may be added in order to improve the conductivity of a resultant composite electrode, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminum.

As per the polymer binder (PB), polymers well known in the art can be used including, preferably, vinylidene fluoride (VDF) polymers and even more particularly, VDF polymers comprising recurring units derived from VDF and from 0.01% to 20% by moles of recurring units derived from at least one (meth)acrylic monomer of formula (III) as defined above.

Non-limiting examples of suitable photo-electrochemical devices include, notably, dye-sensitized solar cells.

The invention also pertains to a dye-sensitized solar cell comprising the polymer electrolyte separator as defined above.

The dye-sensitized solar cell is generally formed by assembling a metal support to which there is applied a metal oxide semiconductor layer, such as a $TiO_2$ semiconductor layer, said metal oxide semiconductor layer being coated with a dye layer, the polymer electrolyte separator as defined above and a conductive electrode.

Non-limiting examples of suitable dyes include, notably, ruthenium and osmium-based dyes such as ruthenium tris(2,2'-bipyridyl-4,4'-dicarboxylate), ruthenium cis-diaqua bipyridyl complexes such as ruthenium cis diaqua bis (2,2'-bipyridyl-4,4'-dicarboxylate), porphyrins such as zinc tetra (4-carboxyphenyl) porphyrin, cyanides such as iron-hexacyanide complexes and phthalocyanines.

The dye-sensitized solar cell is typically closed at the top and at the bottom by an insulating layer, wherein the conductive electrode and the insulated layer on the top of the cell must be optically transparent to solar radiation.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

EXAMPLE 1

Step i) Manufacture of a VDF/HFP/HEA Polymer

In a 4 lt. reactor equipped with an impeller running at a speed of 880 rpm were introduced in sequence 2455 g of demineralized water and 0.63 g of METHOCEL® K100 GR suspending agent.

The reactor was vented and pressurized with nitrogen to 1 bar, then 8.55 g of a 75% by volume solution of t-amyl perpivalate initiator in isododecane were introduced into the reactor, followed by 107 g of HFP monomer and 947 g of VDF monomer. The reactor was then gradually heated to 52° C. to a final pressure of 110 bar. Temperature was maintained constant at 55° C. throughout the whole trial. Pressure was maintained constant at 110 bar throughout the whole trial by feeding a 19.96 g/l aqueous solution of HEA monomer to a total of 709 ml. After 510 minutes the polymerization run was stopped by degassing the suspension until reaching atmospheric pressure. The polymer so obtained was then recovered, washed with demineralised water and oven-dried at 50° C. (814 g).

The polymer so obtained contained 2.3% by moles of HFP and 1.0% by moles of HEA, as determined by NMR.

Step ii) Manufacture of a Hybrid VDF/HFP/HEA-Silica Composite 1.24 g of the VDF/HFP/HEA polymer powder obtained from step i) of Example 1 were dissolved in 23.79 g of RHODIASOLV® IRIS diester mixture. Then, 3.9 g of TEOS were added drop-wise to the stirred solution, followed by 4 ml of aqueous formic acid; the mixture was stirred at 80° C. for 2 hours to ensure the sol-gel reaction (TEOS hydrolysis and polycondensation) so as to obtain a clear solution of a hybrid VDF/HFP/HEA-silica composite. The silica content, calculated assuming complete TEOS hydrolysis/polycondensation to $SiO_2$, was 30% by weight referred to the composite.

Viscosity Stability of VDF/HFP/HEA-Silica Composite

The viscosity of the VDF/HFP/HEA-silica composite obtained from step ii) of Example 1 was measured with a dynamic mechanical spectrometer (Rheometric ARES, geometry: parallel plates (25 mm), mode: dynamic frequency sweep test) at different temperatures.

Data obtained for the VDF/HFP/HEA-silica composite of Example 1, as well as for a gel obtained by mixing the VDF/HFP/HEA polymer obtained from step i) of Example 1 with RHODIASOLV® IRIS diester mixture (comparative Examples 1 and 2), are given in Table 1.

Data obtained for the VDF/HFP/HEA-silica composite of Example 1, without RHODIASOLV® IRIS diester mixture, in N-methyl-2-pyrrolidone (comparative Examples 3 and 4) are also given in Table 1.

TABLE 1

| Run | | Viscosity [Pa × s] |
|---|---|---|
| Ex. 1 | Hybrid VDF/HFP/HEA + 30% $SiO_2$ at 30° C. | $1 \times 10^6$ |
| Ex. 1 | Hybrid VDF/HFP/HEA + 30% $SiO_2$ at 70° C. | $1 \times 10^5$ |
| Ex. 1 | Hybrid VDF/HFP/HEA + 30% $SiO_2$ at 30° C., after 15 days at −24° C. | $2 \times 10^6$ |
| Comp. Ex. 1 | VDF/HFP/HEA at 30° C. | $5 \times 10^4$ |
| Comp. Ex. 2 | VDF/HFP/HEA at 70° C. | $2 \times 10^4$ |
| Comp. Ex. 3 | Hybrid VDF/HFP/HEA + 30% $SiO_2$ at 30° C. | $1 \times 10^5$ |
| Comp. Ex. 4 | Hybrid VDF/HFP/HEA + 30% $SiO_2$ at 70° C. | $5 \times 10^3$ |

Use of Hybrid Fluoropolymers as Electrolyte Separators

The hybrid VDF/HFP/HEA-silica composite obtained from step ii) of Example 1 was mixed with various amounts of $LiN(CF_3SO_2)_2$ and ionic conductivities of the electrolyte separators thereby provided were measured at 25° C. (Table 2).

The electrolyte separators were put between two stainless steel electrodes and sealed in a container.

The resistance of the electrolyte separators was measured and the ionic conductivity (σ) was calculated using the following equation:

Ionic conductivity (σ)=$d/(R_b \times S)$ wherein d is the thickness [cm] of the film, $R_b$ is the bulk resistance [Ω×cm] and S is the area [cm²] of the stainless steel electrode.

TABLE 2

| | Ionic conductivity [S/cm] |
|---|---|
| Ex. 1 + 0.1M $LiN(CF_3SO_2)_2$ | $4.8 \times 10^{-4}$ |
| Ex. 1 + 0.5M $LiN(CF_3SO_2)_2$ | $1.6 \times 10^{-3}$ |
| Ex. 1 + 1.0M $LiN(CF_3SO_2)_2$ | $1.9 \times 10^{-3}$ |

Use of Hybrid Fluoropolymers as Electrolyte Separators in DSSC Cells

The hybrid VDF/HFP/HEA-silica composite obtained from step ii) of Example 1 was mixed with iodide/tri-iodide redox couple and tested as electrolyte separator in a DSSC cell wherein an anode (titanium dioxide) and a cathode (platinum) were placed on either side of the electrolyte. The resulting electrolyte separator was homogeneous.

The efficiency of the DSSC cell was measured using a solar simulator (PEC-L15, Peccell Technologies, Inc.) under 1 sun (1.5 AM) at 25° C. It has been found that the efficiency of a DSCC cell wherein the VDF/HFP/HEA-silica composite of Example 1 mixed with iodide/tri-iodide redox couple was used as electrolyte separator was about 20 times higher than the efficiency of a DSSC cell wherein a standard liquid electrolyte solution was used (50 mM solution of iodide/tri-iodide redox couple in acetonitrile).

The invention claimed is:

1. A process for manufacturing a fluoropolymer hybrid organic/inorganic composite, said process comprising:
   (i) providing a mixture comprising:
      (a) at least one polymer (F), wherein polymer (F) is a fluoropolymer comprising recurring units derived from at least one fluorinated monomer and at least one comonomer (MA) comprising at least one hydroxyl group;
      (b) at least one metal compound (M) of formula (I):

$$X_{4-m}AY_m \quad (I)$$

wherein m is an integer from 1 to 4, A is a metal selected from the group consisting of Si, Ti and Zr, Y is a hydrolysable group, and X is a hydrocarbon group, optionally comprising one or more functional groups;
      (c) a liquid medium comprising at least one compound selected from the group consisting of a diester of formula ($II_{de}$) and an ester-amide of formula ($II_{ea}$):

$$R^1\text{—OOC—}Z_{de}\text{—COO—}R^2 \quad (II_{de})$$

$$R^1\text{—OOC—}Z_{ea}\text{—CO—}NR^3R^4 \quad (II_{ea})$$

wherein:
      $R^1$ and $R^2$, equal to or different from each other, are independently selected from the group consisting of $C_1$-$C_{20}$ hydrocarbon groups,
      $R^3$ and $R^4$, equal to or different from each other, are independently selected from the group consisting of hydrogen, $C_1$-$C_{36}$ hydrocarbon groups, optionally substituted, or wherein $R^3$ and $R^4$ form a cyclic moiety including the nitrogen atom to which they are bound, said cyclic moiety being optionally substituted and/or optionally comprising one or more than one additional heteroatom, and mixtures thereof,
      $Z_{de}$ and $Z_{ea}$, equal to or different from each other, are independently a linear or branched $C_3$-$C_{10}$ divalent alkylene group; and
      (d) optionally, at least one electrolytic salt (ES);
   (ii) reacting at least a fraction of hydroxyl groups of said comonomer (MA) of said polymer (F) with at least a fraction of the hydrolysable groups Y of said compound (M), so as to obtain polymer (Fg), wherein polymer (Fg) is a grafted fluoropolymer comprising one or more pendant groups of formula —$Y_{m-1}AX_{4-m}$; and
   (iii) hydrolysing and/or polycondensing said compound (M) and/or said pendant groups of formula —$Y_{m-1}AX_{4-m}$ to yield a liquid mixture comprising the fluoropolymer hybrid organic/inorganic composite and said liquid medium.

2. The process according to claim 1, wherein the comonomer (MA) of polymer (F) is selected from the group consisting of (meth)acrylic monomers of formula (III) or vinylether monomers of formula (IV):

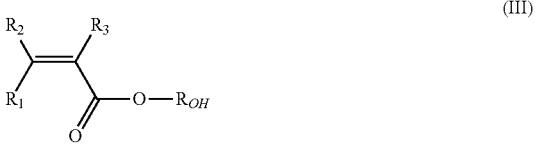

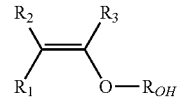

wherein each of $R_1$, $R_2$ and $R_3$, equal to or different from each other, is independently a hydrogen atom or a $C_1$-$C_3$ hydrocarbon group, and $R_{OH}$ is a hydrogen atom or a $C_1$-$C_5$ hydrocarbon moiety comprising at least one hydroxyl group.

3. The process according to claim 1, wherein the comonomer (MA) of polymer (F) complies with formula (III-A):

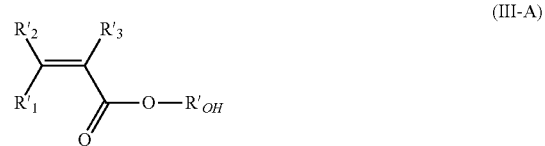

wherein $R'_1$, $R'_2$ and $R'_3$ are hydrogen atoms and $R'_{OH}$ is a $C_1$-$C_5$ hydrocarbon moiety comprising at least one hydroxyl group.

4. The process according to claim 1, wherein polymer (F) is selected from the group consisting of:
   polymers (F-1) comprising recurring units derived from at least one comonomer (MA), from at least one per(halo)fluoromonomer selected from tetrafluoroethylene (TFE) and chlorotrifluoroethylene (CTFE), and from at least one hydrogenated monomer selected from ethylene, propylene and isobutylene, optionally containing one or more additional comonomers, in amounts of from 0.1% to 30% by moles, based on the total amount of TFE and/or CTFE and said hydrogenated monomer(s); and
   polymers (F-2) comprising recurring units derived from at least one comonomer (MA), from vinylidene fluoride (VDF), and, optionally, from one or more fluorinated monomers different from VDF.

5. The process according to claim 1, wherein the compound (M) complies with formula (I-A):

$$R'_{4-m'}E(OR'')_{m'} \quad (I\text{-}A)$$

wherein m' is an integer from 1 to 4, E is a metal selected from the group consisting of Si, Ti and Zr, and R' and R", equal to or different from each other and at each occurrence, are independently selected from $C_1$-$C_{18}$ hydrocarbon groups, optionally comprising one or more functional groups.

6. The process according to claim 1, wherein the liquid medium comprises:
   (i) at least one diester ($II'_{de}$) and at least one diester ($II''_{de}$), optionally in combination with at least one diester of formula ($II'''_{de}$); or
   (ii) at least one ester-amide ($II'_{ea}$) and at least one ester-amide ($II''_{ea}$), optionally in combination with at least one ester-amide of formula ($II_{ea}$); or
   (iii) combinations of (i) and (ii),
   wherein:
   ($II'_{de}$) is $R^1$—OOC—$Z_{MG}$—COO—$R^2$
   ($II'_{ea}$) is $R^1$—OOC—$Z_{MG}$—CO—$NR^3R^4$
   ($II''_{de}$) is $R^1$—OOC—$Z_{ES}$—COO—$R^2$
   ($II''_{ea}$) is $R^1$—OOC—$Z_{ES}$—CO—$NR^3R^4$; and
   ($II'''_{de}$) is $R^1$—OOC—$(CH_2)_4$—COO—$R^2$, wherein:
- $Z_{MG}$ is of formula $MG_a\text{-}CH(CH_3)\text{—}CH_2\text{—}CH_2\text{—}$ or $MG_b\text{-}CH_2\text{—}CH_2\text{—}CH(CH_3)\text{—}$,
- $Z_{ES}$ is of formula $ES_a\text{—}CH(C_2H_5)\text{—}CH_2\text{—}$, or $ES_b\text{—}CH_2\text{—}CH(C_2H_5)\text{—}$; and wherein $R^1$ and $R^2$, equal to or different from each other, are independently selected from the group consisting of $C_1\text{-}C_{20}$ alkyl, $C_1\text{-}C_{20}$ aryl, $C_1\text{-}C_{20}$ alkyaryl, $C_1\text{-}C_{20}$ arylalkyl groups;
- $R^3$ and $R^4$, equal to or different from each other, are selected from the group consisting of $C_1\text{-}C_{20}$ alkyl, $C_1\text{-}C_{20}$ aryl, $C_1\text{-}C_{20}$ alkyaryl, $C_1\text{-}C_{20}$ arylalkyl groups, all said groups optionally comprising one or more than one substituents, optionally having one or more than one heteroatoms, and of cyclic moieties comprising both $R^3$ and $R^4$ and the nitrogen atom to which they are bound, said cyclic moieties optionally comprising one or more than one heteroatoms.

7. The process according to claim 1, wherein the liquid medium comprises:
   (j) a diester mixture consisting essentially of:
      from 70% to 95% by weight of diester of formula $(II'_{de})$;
      from 5% to 30% by weight of diester of formula $(II''_{de})$, and
      from 0 to 10% by weight of diester of formula $(II'''_{de})$; or
   (jj) an ester-amide mixture consisting essentially of:
      from 70% to 95% by weight of ester-amide of formula $(II'_{ea})$;
      from 5% to 30% by weight of ester-amide of formula $(II''_{ea})$, and
      from 0 to 10% by weight of ester-amide of formula $(II'''_{ea})$; or
   (jjj) mixtures of (j) and (jj).

8. The process according to claim 1, wherein the liquid medium further comprises dimethylsulfoxide (DMSO) and, optionally, one or more organic solvents (S) different from DMSO.

9. A fluoropolymer hybrid organic/inorganic composite obtainable by reaction between:
   (a) at least one polymer (F) as defined in claim 1,
   (b) at least one metal compound (M) of formula (I) as defined in claim 1,
   (c) a liquid medium comprising at least one compound selected from the group consisting of a diester of formula $(II_{de})$ and an ester-amide of formula $(II_{ea})$ as defined in claim 1, and
   (d) optionally, at least one electrolytic salt (ES),
   wherein one or more pendant groups of formula $-Y_{m-1}AX_{4-m}$, wherein m, Y, A and X have the same meaning as defined in claim 1, are grafted to the polymer (F) through reaction of at least a fraction of the hydroxyl groups of the comonomer (MA) of said polymer (F) with at least a fraction of the hydrolysable groups Y of said compound (M).

10. A fluoropolymer film comprising the fluoropolymer hybrid organic/inorganic composite according to claim 9 and a liquid medium comprising at least one compound selected from the group consisting of a diester of formula $(II_{de})$ and an ester-amide of formula $(II_{ea})$.

11. The fluoropolymer film according to claim 10, comprising from 1% to 30% by weight of at least one polymer (F).

12. The fluoropolymer film according to claim 10, said fluoropolymer film being a polymer electrolyte separator comprising at least one electrolytic salt (ES).

13. An electrochemical or photo-electrochemical device comprising the polymer electrolyte separator according to claim 12.

14. A metal-ion secondary battery comprising the polymer electrolyte separator according to claim 12.

15. A dye-sensitized solar cell comprising the polymer electrolyte separator according to claim 12.

16. The fluoropolymer film according to claim 11, comprising from 5% to 20% by weight of at least one polymer (F).

17. The fluoropolymer film according to claim 16, said fluoropolymer film being a polymer electrolyte separator comprising at least one electrolytic salt (ES).

18. An electrochemical or photo-electrochemical device comprising the polymer electrolyte separator according to claim 17.

19. A metal-ion secondary battery comprising the polymer electrolyte separator according to claim 17.

20. A dye-sensitized solar cell comprising the polymer electrolyte separator according to claim 17.

* * * * *